US010929167B2

(12) United States Patent
Lin et al.

(10) Patent No.: US 10,929,167 B2
(45) Date of Patent: Feb. 23, 2021

(54) LOW-LATENCY EVENTS ACROSS A VIRTUAL MACHINE BOUNDARY

(71) Applicant: Microsoft Technology Licensing, LLC, Redmond, WA (US)

(72) Inventors: Jason Lin, Bellevue, WA (US); Gregory John Colombo, Kirkland, WA (US); Mehmet Iyigun, Kirkland, WA (US); Yevgeniy Bak, Redmond, WA (US); Christopher Peter Kleynhans, Bellevue, WA (US); Stephen Louis-Essman Hufnagel, Northville, MI (US); Michael Ebersol, Woodinville, WA (US); Ahmed Saruhan Karademir, Seattle, WA (US); Shawn Michael Denbow, Bellevue, WA (US); Kevin Broas, Kirkland, WA (US); Wen Jia Liu, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 140 days.

(21) Appl. No.: 16/243,938

(22) Filed: Jan. 9, 2019

(65) Prior Publication Data
US 2020/0218560 A1    Jul. 9, 2020

(51) Int. Cl.
G06F 9/455    (2018.01)
G06F 9/50    (2006.01)

(52) U.S. Cl.
CPC ........ *G06F 9/45558* (2013.01); *G06F 9/5077* (2013.01); *G06F 2009/45583* (2013.01); *G06F 2009/45587* (2013.01)

(58) Field of Classification Search
CPC .......................... G06F 9/45558; G06F 9/5077
See application file for complete search history.

(56) References Cited

U.S. PATENT DOCUMENTS 9,507,617 B1 * 11/2016 Wang .................... G06F 9/4555
2006/0184938 A1    8/2006 Mangold
(Continued)

OTHER PUBLICATIONS

"International Search Report and Written Opinion Issued in PCT Application No. PCT/US19/069019", dated Apr. 24, 2020, 12 Pages.
(Continued)

*Primary Examiner* — Tammy E Lee
(74) *Attorney, Agent, or Firm* — Workman Nydegger

(57) ABSTRACT

Communicating a low-latency event across a virtual machine boundary. Based on an event signaling request by a first process running at a first virtual machine, the first virtual machine updates a shared register that is accessible by a second virtual machine. Updating the shared register includes updating a signal stored in the shared register. The first virtual machine sends an event signal message, which includes a register identifier, through a virtualization fabric to the second virtual machine. The second virtual machine receives the event signaling message and identifies the register identifier from the message. Based on the register identifier, the second virtual machine reads the shared register, identifying a value of the signal stored in the shared register. Based at least on the value of the signal comprising a first value, the second virtual machine signals a second process running at the second virtual machine.

18 Claims, 4 Drawing Sheets

(56) References Cited

U.S. PATENT DOCUMENTS

2013/0167149 A1 6/2013 Mitsugi et al.
2014/0229769 A1* 8/2014 Abraham ............ G06F 11/0745
 714/43
2017/0228332 A1* 8/2017 Ross ..................... G06F 13/404

OTHER PUBLICATIONS

Wang, Jian, "Survey of State-of-the-Art in Inter-VM Communication Mechanisms", In Research Proficiency Report, Sep. 27, 2009, 25 Pages.
Zhang, et al., "XenSocket: A High-Throughput Interdomain Transport for Virtual Machines", In Proceedings of the International Conference on Distributed Systems Platforms and Open Distributed Processing, Nov. 26, 2007, pp. 184-203.
Hudek, et al."Low Latency Audio", Retrieved From: https://docs.microsoft.com/en-us/windows-hardware/drivers/audio/low-latency-audio, Apr. 20, 2017, 20 Pages.

* cited by examiner

400

| Identifier | Index | Signal | Wake Cookie | |
|---|---|---|---|---|
| VM106b-Event1 | 0 | | | ← 401 |
| VM106b-Event2 | 1 | | | |
| ... | ... | ... | ... | |

| Index | Signal | Wake Cookie | |
|---|---|---|---|
| 0 | | | ← 402 |
| 1 | | | |
| ... | ... | ... | |

LOW-LATENCY EVENTS ACROSS A VIRTUAL MACHINE BOUNDARY

BACKGROUND

Virtualization technology enables a single physical computing system (often referred to as a virtualization host, or simply host) to run multiple virtual computer systems, usually referred to as virtual machines (VMs). During operation, each VM emulates computing hardware supporting an executing operating system, including applications executing within that operating system. In general, a virtualization host provides a virtualization fabric—usually referred to as a hypervisor—that uses physical computing resources to emulate virtual resources for each VM. One goal of virtualization is for the hypervisor to provide isolation between the VMs. Thus, from the perspective of any given VM, a hypervisor provides the illusion that the VM is exclusively interfacing with physical resources (e.g., processor(s), memory, disk storage, etc.), even though the VM only interfaces an abstraction of those physical resources. As such, hypervisors can share physical resources among multiple VMs. Frequently, a hypervisor operates a least two VMs: a privileged "host" VM and one or more "guest" VMs. A host VM can often directly access physical hardware and is generally used to manage the guest VMs.

By enabling operating systems (including applications) to execute in isolation from one another at the same computer system, virtualization technologies provide many security benefits as well as a great deal of flexibility. Nonetheless, it may be desirable for applications at different VMs to interact with each other. When networked, VMs can interact in the same manner that different physical machines might interact—e.g., via network packets, such as TCP/IP packets, UDP packets, etc. In addition, some hypervisors might enable VMs to interact more directly, such as by enabling two VMs to create named pipes between one another (e.g., utilizing visualized serial ports). However, network packets and named pipes include overheads that introduce latency and are thus often too slow for some types of communications. For example, it may be desirable for one VM (e.g., a guest VM) to communicate audio data with another VM (e.g., a host VM that has access to audio input/output hardware). However, audio playback may require latencies on the order of 500 µs, which cannot be achieved in the current state of the art, such as by using network packets and named pipes.

BRIEF SUMMARY

As mentioned in the background, existing inter-VM communication techniques (e.g., such as network communications and pipes) introduce what can be an unacceptable amount of latency for certain uses (e.g., such as audio). These latencies are introduced due to the overheads inherent in use of these communication channels. For example, in order to communicate given data from a first user mode process at a first to VM to a second user mode process at a second VM over a network fabric, the first user mode process might communicate the data to a network stack at the first VM, which then divides the data into appropriate packet-size chunks, constructs network packets around each chunk of data (e.g., by adding an ethernet frame, a TCP/IP or UDP header, etc.), places the network packets in a send queue, and eventually removes the packets from the send queue and sends the network packets over a network fabric. After receiving the packets at the network fabric, a network stack at the second VM might place the packets in a receive queue, eventually remove the packets from the receive queue, decode the packets (e.g., parsing a TCP/IP or UDP header, an ethernet frame, etc.), reassemble the chunks of data, and send the data to the second user mode process. While named pipes be able to achieve lower overheads than network communications, they similarly need to chunk and queue data, leading to processing overheads at both ends of the pipe.

At least some embodiments described herein overcome these deficiencies in existing inter-VM communications, by providing mechanisms for very low overhead (and, thus, low-latency) signaling between VMs, including mechanisms for processes running at those VMs to signal one another. These low-latency signaling mechanisms provide a relatively small amount of shared memory between two (or more) VMs, which is used by these VMs to store state information. These low-latency signaling mechanisms also enable these VMs to send lightweight inter-VM event signal messages to one other, enabling a given VM to very quickly instruct another VM to check the state information. In embodiments, the state information includes one or more signal bits and one or more wake cookie bits; upon receiving an event signal message, a receiving VM uses these signal bit(s) and these wake cookie bit(s) to determine whether it should signal a local process in response to the event signal message. Embodiments can couple these low-latency signaling mechanisms with additional shared memory to communicate actual data. Thus, for example, a first VM might write data to this additional shared memory, and then use the signaling mechanisms described herein to very quickly instruct a second VM to read from that shared memory (or vice versa).

In accordance with the foregoing, some embodiments include methods, systems, and computer program products that communicate low-latency events across a virtual machine boundary. A computer system provides a virtualization fabric hosting a plurality of virtual machines. Based on an event signaling request by a first process running at a first virtual machine, the first virtual machine updates a shared register that is accessible by a second virtual machine. Updating the shared register includes updating a signal stored in the shared register. The first virtual machine sends an event signal message through the virtualization fabric to the second virtual machine. The event signal message includes a register identifier of the shared register. The second virtual machine receives the event signaling message sent by the first virtual machine and identifies the register identifier from the message. Based on the register identifier, the second virtual machine reads the shared register, including identifying a value of the signal stored in the shared register. Based at least on the value of the signal comprising a first value, the second virtual machine signals a second process running at the second virtual machine.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein overcome the deficiencies of existing inter-VM communications, by providing mechanisms for very low overhead (and, thus, low-latency) signaling between VMs, including mechanisms for processes running at those VMs to signal one another. These low-latency signaling mechanisms provide a relatively small amount of shared memory between two (or more) VMs, which is used by these VMs to store state information. These low-latency signaling mechanisms also enable these VMs to send lightweight inter-VM event signal messages to one other, enabling a given VM to very quickly instruct another VM to check the state information. In embodiments, the state information includes one or more signal bits and one or more wake cookie bits; upon receiving an event signal message, a receiving VM uses these signal bit(s) and these wake cookie bit(s) to determine whether it should signal a local process in response to the event signal message. Embodiments can couple these low-latency signaling mechanisms with additional shared memory to communicate actual data. Thus, for example, a first VM might write data to this additional shared memory, and then use the signaling mechanisms described herein to very quickly instruct a second VM to read from that shared memory (or vice versa).

Figure 1:
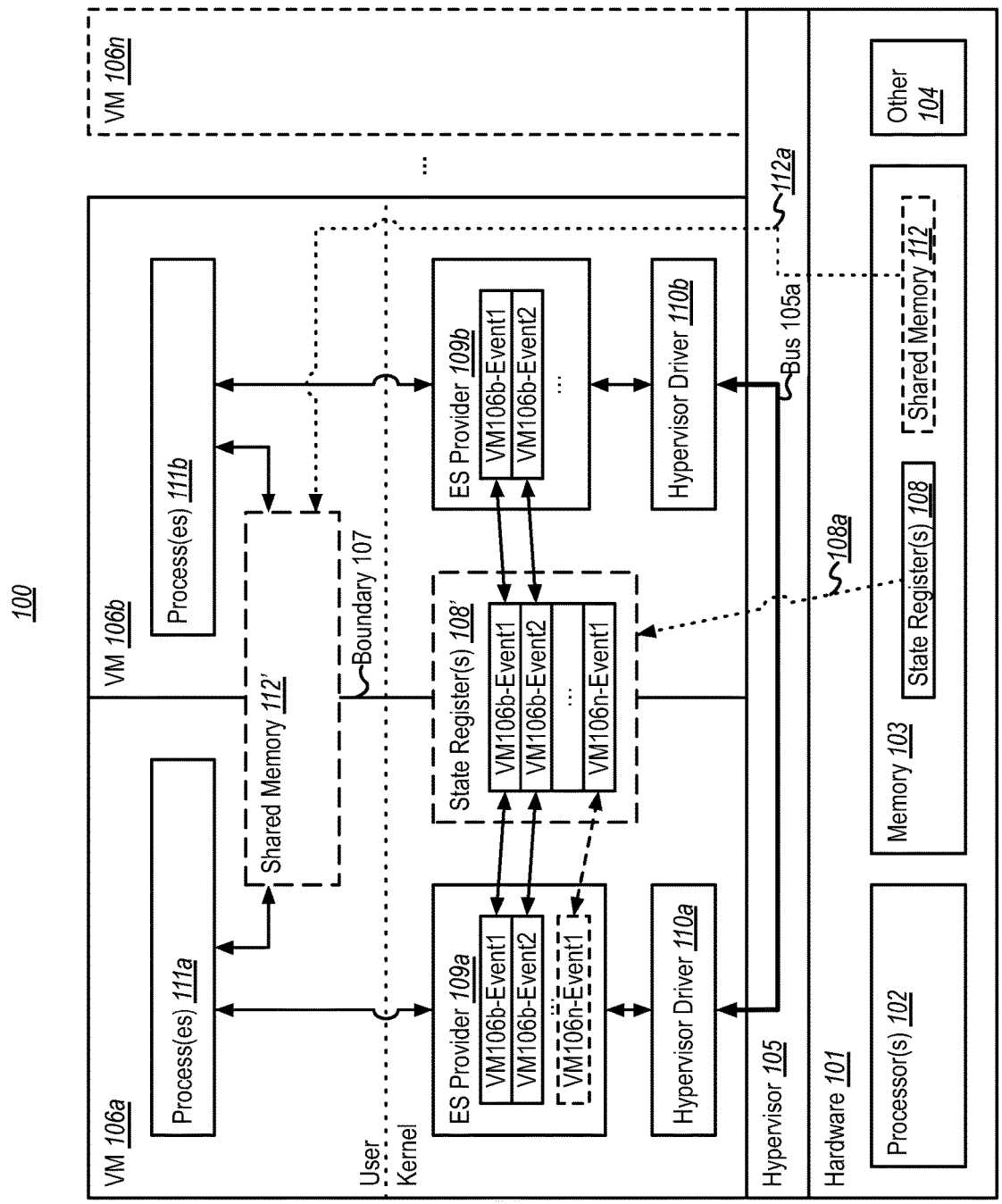
FIG. 1 illustrates an example computing environment that facilitates communicating low-latency events across virtual machine boundaries.

To the accomplishment of the foregoing, FIG. 1 illustrates an example computing environment 100 that facilitates communicating low-latency events across virtual machine boundaries. As shown, computing environment 100 includes computing hardware 101 that includes, for example, one or more processors 102, system memory 103, and any other hardware 104 that is appropriate for the particular computing environment 100 in which the embodiments described herein are implemented (e.g., durable storage, network communications hardware, user input/output hardware, audio input/output hardware, etc.).

As shown, hardware 101 is configured as a virtualization host that provides a virtualization fabric in the form of a hypervisor 105. As discussed previously, hypervisors generally use physical computing resources to support multiple VMs. Thus, in FIG. 1, hypervisor 105 is shown as supporting VMs 106a-106n (referred to generally as VMs 106), including at least VMs 106a and VM 106b, by exposing portions of hardware 101 to the VMs 106 as virtualized hardware resources. In doing so, the hypervisor 105 enforces isolation between the VMs 106, thereby creating logical boundaries between the VMs. For example, the hypervisor 105 might partition processor 102 resources among the VMs 106 (e.g., in terms allocating different segments of processing time among the VMs 106, in terms allocating different individual processor cores among the VMs 106, etc.), and hypervisor 105 might partition and allocate different portions of memory 103 to each VM 106 while preventing a given VM 106 from accessing memory allocated to the other VMs 106.

Using virtualized hardware resources, each VM 106 can execute an operating system kernel and one or more user mode processes (e.g., operating system processes, and/or third-party processes). As such, FIG. 1 shows that VMs 106a and 106b each provide a kernel mode of operation (i.e., executing an operating system kernel and related system processes) and a user mode of operation (i.e., executing user mode processes). In embodiments, VMs 106 could all execute the same type of operating system kernel or could execute entirely different operating system kernels. While, for completeness, FIG. 1 illustrates both user and kernel modes, embodiments herein could operate entirely within kernel mode, entirely within user mode, or (as shown) within a combination of user and kernel mode.

In FIG. 1, VM 106a and VM 106b are configured for communicating low-latency events across a boundary 107 separating the VMs. For example, FIG. 1 illustrates that memory 103 includes a portion of memory configured as one or more state register(s) 108. Following line 108a, these state registers 108 are also shown conceptually as state registers 108'—which are illustrated as logically bridging the boundary 107 between VM 106a and VM 106b. Thus, the state registers 108' are accessible to both VM 106a and VM 106b. In embodiments, and as shown, state registers 108' might include a plurality of registers, each capable of storing event state information for a different logical data connection (e.g., event) between VM 106a and VM 106b.

VM 106a and VM 106b are also shown as including corresponding event signaling (ES) providers 109 (i.e., ES provider 109a within VM 106a, and ES provider 109b within VM 106b), as well as corresponding hypervisor drivers 110 (i.e., hypervisor driver 110a within VM 106a, and hypervisor driver 110b within VM 106b). In general, ES providers 109 are responsible for creating local event signaling objects (e.g., VM106b-Event1, VM106b-Event2, etc.) at their corresponding VM, and for synchronizing these local ES objects with appropriate state registers 108' (e.g., as indicated by the arrows between ES providers 109a/109b and state registers 108'). In general, the hypervisor drivers 110 are responsible for communicating event signal messages between two (or more) VMs over a bus 105a provided by the hypervisor 105 (e.g., based on a request by the ES provider 109 within the same VM as the hypervisor driver, as indicated by the arrow between ES provider 109a and hypervisor driver 110a and the arrow between ES provider 109b and hypervisor driver 110b). While shown in FIG. 1 as separate components, the ES provider 109 and hypervisor driver 110 at a given VM 106 might be part of a unified component.

While the foregoing components (i.e., state registers 108', ES providers 109, and hypervisor drivers 110) provide a framework for communicating low-latency events across boundary 107, these components generally operate to facilitate event signaling between other software components. Thus, VM 106a is shown as including one or more corresponding processes 111a, and VM 106b is shown as including one or more corresponding processes 111b. These processes 111a/111b call ES providers 109a/109b, respectively, in order to signal each other over boundary 107 (e.g., as indicated by the arrow between processes 111a and ES provider 109a, and the arrow between processes 111b and ES provider 109b).

While processes 111 are shown within user mode, and while state registers 108', ES providers 109, and hypervisor drivers 110 are shown within kernel mode, it is again emphasized that embodiments could operate entirely within kernel mode, entirely within user mode, or within a combination of user and kernel mode. As such, each of these components/data structures (i.e., processes 111, state registers 108', ES providers 109, and hypervisor drivers 110) could exist—individually or collectively—within user mode and/or kernel mode.

As shown in FIG. 1, memory 103 might also include a portion of shared memory 112 that is configured by the hypervisor 105 to be accessible to both VM 106a and VM 106b. Thus, following line 112a, this shared memory 112 (if present) is also shown conceptually as shared memory 112', which also logically bridges the boundary 107 between VM 106a and VM 106b. As shown by the arrows between processes 111a/111b and shared memory 112', this shared memory 112' can be accessed (i.e., read from and/or written to) by processes 111a/111b.

Figure 2:
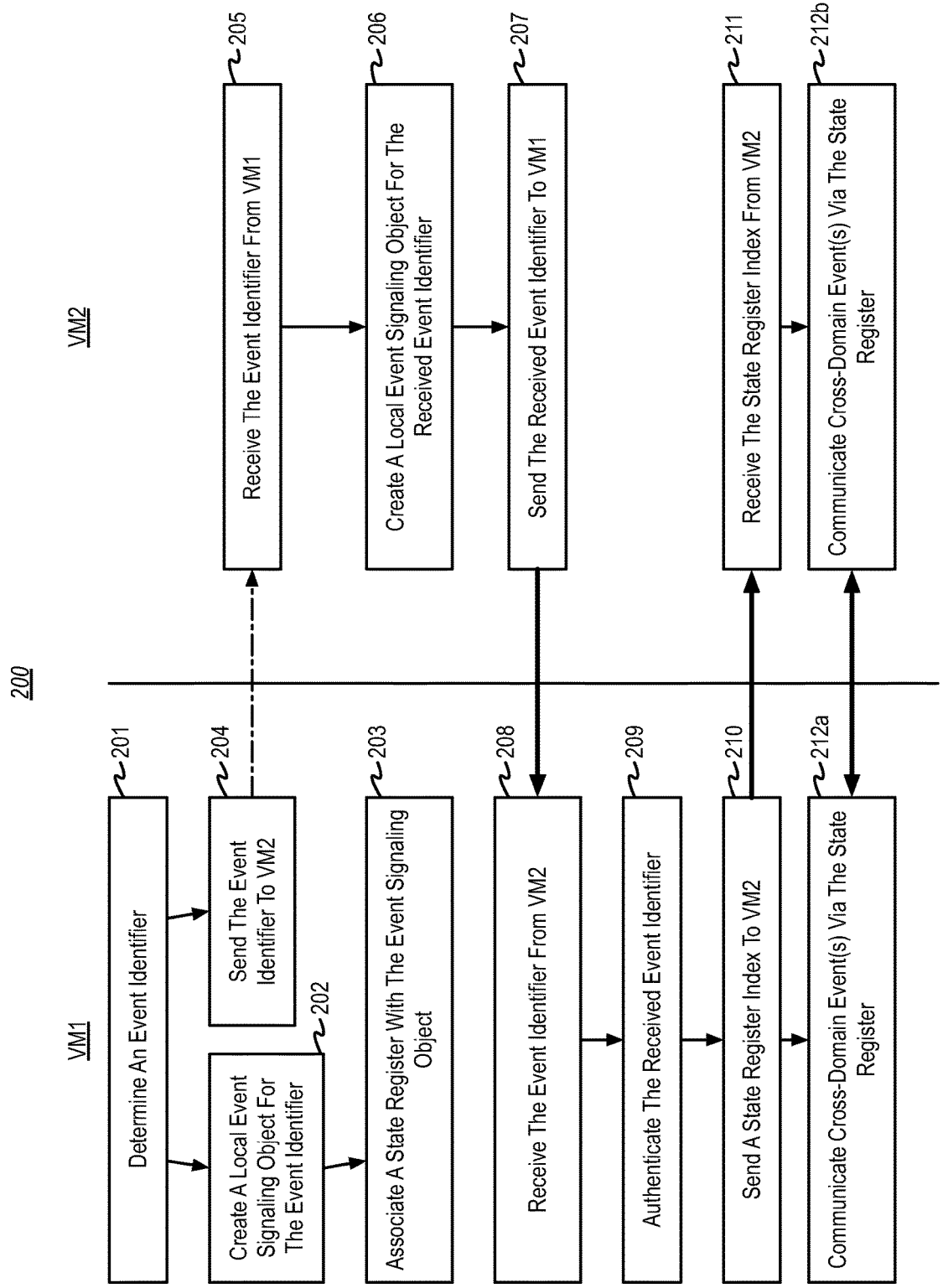
FIG. 2 illustrates a flowchart of an example method for establishing low-latency communications between VMs.

FIG. 2 illustrates a flowchart of an example method 200 for establishing low-latency communications between VMs. Method 200 is now described in connection with the components and data structures of example computing environment 100 of FIG. 1. Thus, embodiments of method 200 might be implemented at a computer system (e.g., hardware 101) that provides a virtualization fabric (e.g., hypervisor 105) hosting a plurality of virtual machines (e.g., VMs 106), including a first virtual machine (e.g., VM 106a) and a second virtual machine (e.g., VM 106b).

In FIG. 2, method 200 includes acts/steps that are performed by two different VMs—VM1 in the left column, and VM2 in the right column. In the description that follows, VM1 will be described using VM 106a, while VM2 will be described using VM 106b, though it will be appreciated that method 200 can operate equally well if this is reversed. In embodiments, the acts performed by VM1 might be performed by a VM having elevated privileges, such as a host VM. Thus, in embodiments, VM1 (i.e., VM 106a) might be a host VM, while VM2 (i.e., VM 106b) is a guest VM. It may be desirable for VM1 to be a host VM so that it can have elevated access rights, such as privileged access to hardware (e.g., audio input/output hardware in the other hardware 104). However, it may also be the case that both VMs are host VMs, or that both VMs are guest VMs.

As shown in FIG. 2, method 200 includes an act 201 at VM1 of determining an event identifier. For example, as part of initiating a low-latency communications session (event) with VM 106b, VM 106a can determine an event identifier for an event signaling object that will be used to manage the session. This event identifier can be any type of identifier, so long as it uniquely identifies the session. Thus, the event identifier could include one or more globally unique identifiers (GUIDs), one or more universally unique identifiers (UUIDs), and the like. In embodiments, the event identifier might comprise the identity of VM 106b (e.g., by name, by GUID, by UUID, etc.) along with an identifier for a particular low-latency communications session with VM 106b. For purposes of illustration, if this is the first low-latency communications session with VM 106b, the VM 106a could choose an event identifier such as "VM106b-Event1." The particular component within VM 106a that determines the event identifier can vary depending on implementation, but in embodiments it might be determined by processes 111a as part of initiating communications with processes 111b, or it might be determined by ES provider 109a based on a call from processes 111a.

Based on having determined the event identifier in act 201, method 200 includes an act 202 at VM1 of creating a local event signaling object for the event identifier. For example, ES provider 109a might create a local ES object based on the event identifier. This is shown in FIG. 1 as an object within ES provider 109a labeled "VM106b-Event1." ES provider 109a might create this ES object based on, for example, an application programming interface (API) call received from processes 111a. In connection with act 202, method 200 also includes an act 203 of associating a state register with the event signaling object. For example, as shown in state registers 108', ES provider 109a can allocate a particular register to the "VM106b-Event1" event. While acts 202 and 203 are shown as occurring serially, implementations might perform these acts in parallel, or even in reverse order.

In view of acts 202 and 203, it will be appreciated that embodiments of method 200 might comprise, at the first virtual machine, creating a first event signaling object corresponding to the event identifier, and associating the shared register with the first event signaling object.

Also based on having determined the event identifier in act 201, method 200 includes an act 204 of sending the event identifier to VM2. For example, VM 106a can communicate the event identifier to VM 106b. The particular component within VM 106a that performs this communication can vary depending on implementation, but in embodiments it might be performed by processes 111a (again, as part of initiating communications with processes 111b). Correspondingly, method 200 also includes an act 205 at VM2 of receiving the event identifier from VM1. For example, VM 106b can receive the event identifier from VM 106a. Again, the particular component within VM 106b that receives this communication can vary depending on implementation, but in embodiments it might be performed by processes 111b.

Notably, the arrow between acts 204 and 205 is shown using a broken line, while all other arrows are shown using heavy solid lines (corresponding to bus 105a of FIG. 1). This is to indicate communication of the event identifier might occur using a communications channel other than bus 105a. For example, the event identifier might be communicated over a network communications channel established between processes 111a and processes 111b, through shared memory 112', etc. In embodiments, this communication channel is one that can be created and maintained by an operating system itself (e.g., such as a network channel), and thus might be termed an operating system-level communications channel. This is in contrast to bus 105a which, in embodiments, is created and maintained in connection with the hypervisor 105, and which thus might be termed a hypervisor-level communications channel.

In view of acts 204 and 205, it will be appreciated that, in embodiments of method 200, a first communications channel might comprise an operating system-level communications channel, and a second communications channel might comprise a hypervisor-level communications channel might comprise. In addition, embodiments of method 200 might comprise, at the first virtual machine, communicating an event identifier to the second virtual machine over the first communications channel; and, at the second virtual machine, receiving the event identifier from the first virtual machine over the first communications channel.

Based on VM2 having received the event identifier (act 205), method 200 includes an act 206 at VM2 of creating a local event signaling object from the received event identifier. For example, similar to act 202, ES provider 109b might create a local ES object based on the event identifier. This is shown in FIG. 1 as an object within ES provider 109b labeled "VM106b-Event1." ES provider 109b might create this ES object based on, for example, an API call received from processes 111b. In view of act 206, it will be appreciated that embodiments of method 200 might comprise, at the second virtual machine, creating a second event signaling object corresponding the event identifier.

Method 200 also includes an act 207 at VM2 of sending the received event identifier to VM1, and a corresponding act 208 at VM1 of receiving the event identifier from VM2. Notably, the arrow connecting acts 207 and 208 uses a heavy solid line, meaning that this time the event identifier is sent over a hypervisor-level communications channel. Thus, for example, acts 207 and 208 can comprise hypervisor driver 110b sending the event identifier over bus 105a (e.g., based on a request from ES provider 109b), and hypervisor driver 110a receiving the event identifier at bus 105a. In view of acts 207 and 208, it will be appreciated that embodiments of method 200 might comprise, at the second virtual machine, sending the event identifier to the first virtual machine over the second communications channel; and, at the first virtual machine, receiving the event identifier from the second virtual machine over the second communications channel.

Method 200 also includes an act 209 at VM1 of authenticating the received event identifier. For example, ES provider 109a might verify that there exists an ES object (i.e., ES object "VM106b-Event1") corresponding to the received event identifier. ES provider 109a might also verify that this ES object corresponds to the VM from which the event identifier was received.

If the authentication of act 209 succeeds, method 200 also includes an act 210 at VM1 of sending a state register index to VM2, and a corresponding act 211 at VM2 of receiving the state register index from VM2. Again, the arrow connecting acts 210 and 211 uses a heavy solid line, meaning that the state register index is sent over the hypervisor-level communications channel. Thus, for example, acts 210 and 211 can comprise hypervisor driver 110a sending the index to the state register 108' corresponding to VM106b-Event1 over bus 105a (e.g., based on a request from ES provider 109a), and hypervisor driver 110b receiving that register index at bus 105a.

Method 200 also includes acts 212a at VM1 and 212b at VM2 of communicating cross-domain event(s) via the associated state register. For example, ES providers 109a and 109b can communicate event signal messages over bus 105a, while communicating actual event signals via the state register 108' corresponding to VM106b-Event1. This process is described in more detail in connection with method 300 of FIG. 3 (which picks up after act 211).

Notably, acts 201-211 can be repeated to create number of communications sessions (events). For example, FIG. 1 shows that acts 201-211 can be repeated to create a second event for VM 106b (i.e., local ES objects and register for "VM106b-Event2" in FIG. 1). In addition, method 200 can be applied to multiple VMs in the right column. For example, FIG. 1 shows that VM1 might also participate in method 200 with VM 106n, to create a local ES object and associate a register for "VM106n-Event1".

In view of acts 209-211, it will be appreciated that embodiments of method 200 might comprise, at the first virtual machine, authenticating the event identifier, and sending the register identifier to the second virtual machine over the second communications channel. Embodiments of method 200 might also comprise, at the second virtual machine, receiving the register identifier from the first virtual machine over the second communications channel.

As will be appreciated by one of ordinary skill in the art, method 200 operates such that VM1 functions to initiate and manage the creation of events, and such that VM2 engages in the process. As such, VM1 might be viewed as a host or master, and VM2 might be viewed as a client or slave. For example, VM1 first establishes an event identifier, creates a local ES object for the event identifier, allocates a state register for the event identifier, and sends the event identifier to VM2. Upon receiving the event identifier, VM2 creates its own local ES object for the event identifier and sends the event identifier back to VM1 over a privileged channel. VM1 then verifies the validity of the event identifier and sends the register index to VM2 over the privileged channel only when the event identifier is valid. Notably, VM2 cannot engage in an event without first receiving an event identifier from VM1. Furthermore, VM2 cannot cause VM1 to allocate any memory (either via ES object or state registers) by sending it invalid event identifiers. As such, method 200 is resilient to denial of service (DoS) attacks against VM1 that would cause VM1 to make memory allocations.

Figure 3:
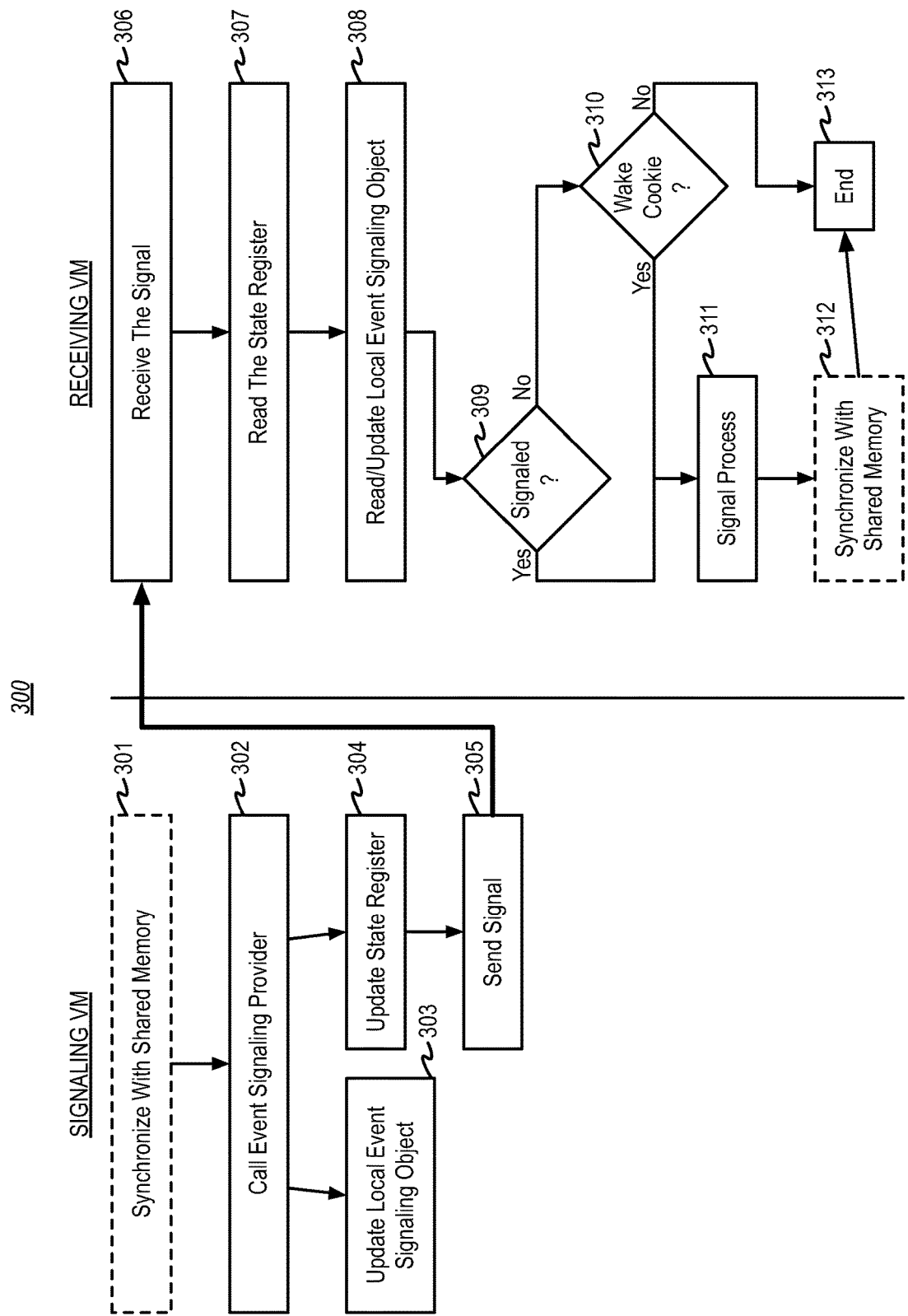
FIG. 3 illustrates a flowchart of an example method for communicating a low-latency event across a VM boundary.

As mentioned, once a communications session (event) has been established between VM1 and VM2 (using acts 201-211), they can communicate cross-domain event(s) via the associated state register (i.e., acts 212a and 212b). To demonstrate this process, FIG. 3 illustrates a flowchart of an example method 300 for communicating a low-latency event across a VM boundary. Method 300 is now described in connection with the components and data structures of example computing environment 100 of FIG. 1 and picks up after act 211 of method 200 (and, thus, can be viewed as an extension to method 200). Like method 200, embodiments of method 300 might be implemented at a computer system (e.g., hardware 101) that provides a virtualization fabric (e.g., hypervisor 105) hosting a plurality of virtual machines (e.g., VMs 106), including a first virtual machine (e.g., VM 106a) and a second virtual machine (e.g., VM 106b).

Method 300 includes acts/steps that are performed by a signaling VM in the left column, and by a receiving VM in the right column. Thus, the identity of the VM in each column will depend on which VM initiates the sending of a particular signal, and which VM is the recipient of that signal. In the description that follows, VM 106b will be described as the signaling VM, while VM 106a will be described as the receiving VM. However, embodiments might permit both VM 106a and VM 106b to initiate method 300 as the signaling VM at virtually any time. As such, method 300 can be used for both unidirectional signaling (e.g., from VM 106b to VM 106a) and bi-directional signaling (e.g., between VM 106a to VM 106b).

If shared memory 112' is present, method 300 might begin with an act 301 at the signaling VM of synchronizing with shared memory. For example, if processes 111a at VM 106a and processes 111b at VM 106b use shared memory 112' to communicate data, processes 111b at VM 106b might update the shared memory 112' with data that is to be read by processes 111a, when it is signaled. As a more concrete example, suppose that VM 106a is a host VM that has privileged access to audio hardware (i.e., other hardware 104). In this situation, processes 111b at VM 106b might need to send audio data to processes 111a at VM 106a for payback. As such, in act 301, processes 111b might write a portion of audio data that is to be communicated to processes 111a to shared memory 112'. In view of act 301, it will be appreciated embodiments of method 300 might comprise a first process running at the first virtual machine synchronizing with shared memory.

Regardless of whether or not act 301 was actually performed, method 300 includes an act 302 at the signaling VM of calling an event signaling provider. For example, processes 111b might make an API call to ES provider 109b, requesting that a signal be sent to VM 106a for event VM106b-Event1 (which was previously created using acts 201-211 in FIG. 2). In embodiments, one or more of processes 111b might then block/sleep, waiting for a reply signal.

Method 300 also includes acts at the signaling VM of updating a local event signaling object (act 303) and updating a state register (act 304). While acts 303 and 304 are shown as occurring in parallel, implementations might perform these acts serially (in either order). For example, ES provider 109b might update the ES object within provider 109b that corresponds to VM106b-Event1, as well as the register within state registers 108' that corresponds to VM106b-Event1. This could include updating the ES object and register in parallel, or updating one of the structures (e.g., the ES object) and copying its value(s) into the other structure (e.g., the register). Regardless the exact mechanism for updating the ES object and register, the result is that they both store that same value(s). In view of acts 303 and 304, it will be appreciated that embodiments of method 300 might comprise the first virtual machine synchronizing a first event signaling object at the first virtual machine with the shared register.

Figures 4, 5:
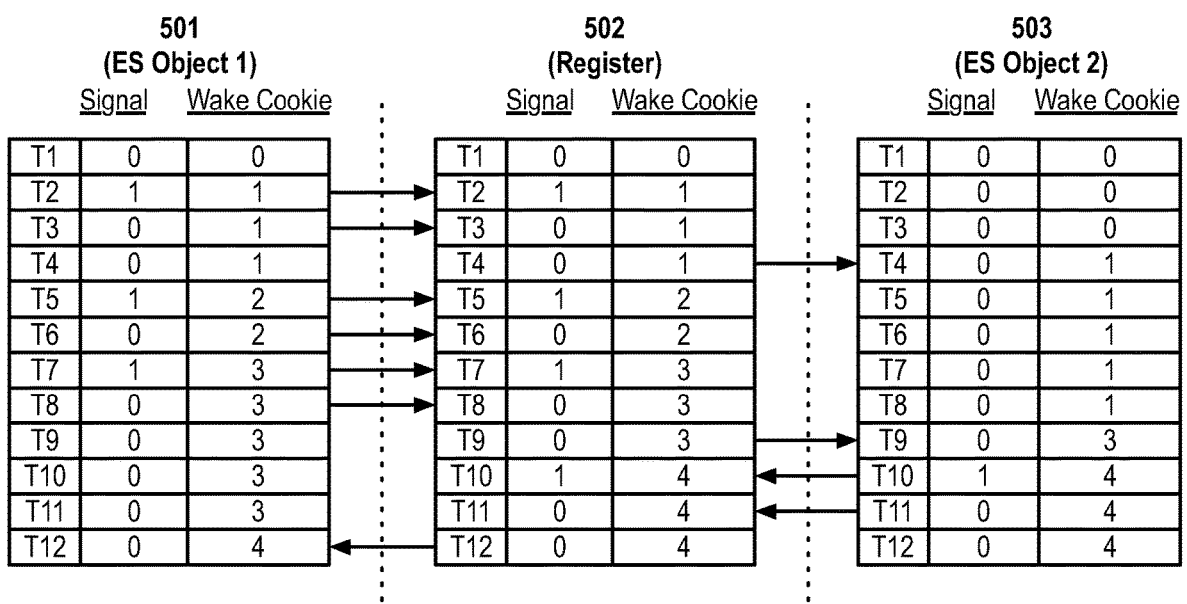
FIG. 4 illustrates an example of data that might be stored in connection with event signaling objects and in connection with registers.
FIG. 5 illustrates an example of use of a wait cookie while communicating low-latency events across virtual machine boundaries.

The particular data that is updated in the ES object and register can vary depending on implementation. However, in embodiments, a register (and, similarly, an ES object) stores one or more bits corresponding a signal, and one or more bits corresponding to a wake cookie. For example, FIG. 4 illustrates an example 400 of data that might be stored in connection with ES objects and in connection with registers, according to one or more embodiments. In particular, FIG. 4 includes a first table 401 that shows that ES objects might store at least the event identifier for the ES object, a register index (i.e., an index of the register to which the ES object was associated in act 203), a signal, and a wake cookie. Table 402, on the other hand, shows that registers might store at least a signal and a wake cookie. In this example, updating the local event signaling object (act 303) and updating the state register (act 304) can include updating the one or more signal bits and updating the one or more wake bits in the ES object and the register corresponding to VM106b-Event 1. In embodiments, a signal might comprise a binary indication (e.g., set or cleared), and the wake cookie might comprise an incrementing value. Examples of the interaction of signals and wake cookies will be described later in connection with FIG. 5.

In view of act 303, it will be appreciated embodiments of method 300 might comprise, at the first virtual machine, and based on an event signaling request by a first process running at the first virtual machine, updating a shared register that is accessible by a second virtual machine, updating the shared register including updating a signal stored in the shared register. Embodiments of method 300 might also comprise updating a wake cookie.

Returning to FIG. 3, Method 300 also includes an act 305 at the signaling VM of sending a signal to the receiving VM, and a corresponding act 306 at the receiving VM of receiving the signal from the signaling VM. Notably, the arrow connecting acts 305 and 306 uses a heavy solid line, meaning that the event identifier is sent over a hypervisor-level communications channel (e.g., bus 105a). For example, hypervisor driver 110b can send an event signal message over bus 105a (e.g., based on a request from ES provider 109b), and hypervisor driver 110a receiving the event signal message at bus 105a. Notably, this event signal message can be extremely lightweight, perhaps including only the state register index as a payload. In view of act 305, it will be appreciated embodiments of method 300 might comprise, at the first virtual machine, sending an event signal message through the virtualization fabric to the second virtual machine, the event signal message including a register identifier of the shared register. Similarly, embodiments of method 300 might comprise, at the second virtual machine, receiving the event signaling message sent by the first virtual machine and identifying the register identifier from the message.

Method 300 also includes an act 307 at the receiving VM of reading the state register. For example, based on the event signal message received in act 306, ES provider 109a can read the appropriate register in state registers 108', in order to obtain the value(s) placed in the state register by MV 106b in act 304—such as a signal value, a wake cookie value, etc. In embodiments, ES provider 109a identifies the appropriate state register based on a register index included in the event signal message. However, ES provider 109a might identify the appropriate register in some other way, such as based on event identifier (e.g., VM106b-Event1). In view of act 307, it will be appreciated embodiments of method 300 might comprise, at the second virtual machine, and based on the register identifier, reading the shared register, including identifying a value of the signal stored in the shared register. In addition, embodiments of method 300 might comprise, at the second virtual machine, and based on the register identifier, identifying a value of the wake cookie stored in the shared register.

Method 300 also includes an act 308 at the receiving VM of reading and updating the local event signaling object. For example, ES provider 109a can read one or more value(s) stored in an appropriate ES object (e.g., the ES object corresponding to VM 106b-Event1). Then, ES provider 109a might update one or more of these value(s) stored in that ES object with corresponding value(s) that were read from the state register in act 307 (if the values read from the register are different than the locally-stored values). For example, ES provider 109a might read and update one or more of a signal value, a wake cookie value, etc. In view of act 308, it will be appreciated that embodiments of method 300 might comprise the second virtual machine synchronizing a second event signaling object at the second virtual machine with the shared register.

Method 300 also includes an act 309 at the receiving VM of determining if a signal is present. For example, ES provider 109a can determine whether or not the value of the signal that was read from the state register in act 307 indicates that a signal should be sent to one or more processes. To illustrate, if the one or more signal bits store a binary value (e.g., a single bit) a signal may be indicated if the binary value is set (e.g., to a 1). If a signal was indicated (e.g., if a signal bit was set to a 1), then following the "yes" arrow from the decision block, method 300 can include an act 311 at the receiving VM of signaling a process. For example, ES provider 109a might send a signal to processes 111a. In embodiments, this signal wakes at least one of processes 111a and causes it to take some action in response to the signal. In view of acts 309 and 311, it will be appreciated embodiments of method 300 might comprise, at the second virtual machine, and based at least on the value of the signal comprising a first value, signaling a second process running at the second virtual machine.

As shown, if shared memory 112' is present, method 300 might include an act 312 at the receiving VM of synchronizing with shared memory. For example, processes 111*a* might read the shared memory 112' to obtain the data that was written by processes 111*b* in act 301. Thus, if VM 106*a* is a host VM that has privileged access to audio hardware (i.e., other hardware 104), processes 111*a* might play back audio data obtained from the shared memory. Regardless of whether or not act 312 is present, method 300 can end at act 313. In view of act 312, it will be appreciated that embodiments of method 300 might comprise a second process running at the second virtual machine synchronizing with the shared memory based on the second process having been signaled.

Returning to act 309, if a signal was not indicated (e.g., if the signal bit was set to a 0), then following the "no" arrow from the decision block, method 300 can include an act 310 at the receiving VM of determining if a wake cookie has changed. For example, ES provider 109*a* can determine if the value of the wake cookie that was read from the state register in act 307 is different from the value that was read from the local ES object in act 308. If this is the case, then following the "yes" arrow from the decision block, method 300 can proceed to act 311 at the receiving VM of signaling the process (and subsequent acts). Otherwise, if the wake cookie is unchanged, then following the "no" arrow from the decision block, method 300 can end at act 313.

In view of acts 310 and 311, it will be appreciated embodiments of method 300 might comprise, at the second virtual machine, comparing the first value of the wake cookie with a second value of a locally-stored wake cookie, and wherein the second virtual machine signals the second process running at the second virtual machine only when the first value of the wake cookie is different from the second value of a locally-stored wake cookie.

Notably, the ES provider at the receiving VM might not wake every time an event signal message is sent to it over bus 105*a*. For example, the receiving ES provider may not be allocated processor time when the event signal message is received, the receiving ES provider may be blocked due to an interrupt when the event signal message is received, a kernel at the receiving VM may choose not to forward the event signal message to the receiving ES provider, etc. As such, a receiving ES provider might miss one more event signal messages sent to it by another VM. Use of a wake cookie in act 310 ensures correct behaviors for receiving ES providers, even if one or more event signal messages are missed.

By way of demonstration, FIG. 5 illustrates an example 500 of use of a wait cookie while communicating low-latency events across virtual machine boundaries. In particular, example 500 includes three timing diagrams 501-503. Timing diagram 501 corresponds to a first ES object at a first VM (e.g., the ES object at ES provider 109*a* corresponding to event VM106*b*-Event1), timing diagram 502 corresponds to a state register (e.g., the state register corresponding to event VM106*b*-Event1), and timing diagram 503 corresponds to a second ES object at a second VM (e.g., the ES object at ES provider 109*b* corresponding to event VM106*b*-Event1).

As shown in FIG. 5, at time T1 the values of the signal and wake cookie in both ES objects and the wake cookie are all 0's. This might, for example, be the state of these data structures after initially setting up event VM106*b*-Event1 (e.g., after act 211 of method 200). In the example of FIG. 5, each time one ES provider signals another ES provider it sends a pair of signaling events: a first to set the signal bit (i.e., to signal the other VM to wake a process), and another to clear the signal bit. The wake cookie incremented for each pair of signaling events. For example, at time T2 a first ES provider at the first VM updates the signal and the wake cookie to 1's in both its local ES object and in the register, and then at time T3 it updates the signal to 0 in both its local ES object and in the register.

As shown, if the second ES provider at the second VM wakes at time T4 it reads a signal of 0 and a wake cookie of 1 from the register (and updates its local copies with those values). If method 300 lacked act 310, then at time T4 the second ES provider would have seen a zero value for the signal in act 309 and would not have singled a process at act 311. However, since method 300 includes act 310, the second ES provider sees that the cookie value that was just read from the register differs from its locally-stored wake cookie, and it thus proceeds to signal a process at act 311. As such, the signal sent by the first VM was not lost, even though the second ES provider did not wake for each update by the first ES provider.

In embodiments, if a receiving ES provider misses multiple set/clear cycles, it wakes a signaled process only once. This is demonstrated in FIG. 5 at times T5-T9. Here, the first ES provider completes two set/clear cycles (i.e., times T5-T8) before the second ES provider wakes at time T9. Following method 300, however, the second ES provider will only signal a process once when it wakes at time T9. Notably, by configuring ES providers to use wake cookies to signal a process only once each time the ES provider wakes—even if another VM has sent multiple signals since the last time the ES provider woke—method 300 provides resiliency against DoS attacks, since it can rate-limit how often a signaled process can be awoken by another virtual machine. Times T10-T12 demonstrate that signaling, including use of wake cookies, can operate for signaling in the other direction as well.

Accordingly, the embodiments herein overcome deficiencies in existing inter-VM communications techniques, by providing mechanisms for very low overhead (and, thus, low-latency) signaling between VMs. These low-latency signaling mechanisms use shared memory (i.e., registers) between VMs to store state information, such as a signal and a wake cookie. These low-latency signaling mechanisms also enable these VMs to send lightweight inter-VM event signal messages to one other, enabling a given VM to very quickly instruct another VM to check the state information in the registers. Upon receiving an event signal message, a receiving VM uses the signal and wake cookie to determine whether it should signal a local process in response to the event signal message. These low-latency signaling mechanisms can be coupled with additional shared memory to communicate actual data.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, the computer system providing a virtualization fabric hosting a plurality of virtual machines including a first virtual machine and a second virtual machine, the method for communicating a low-latency event across a virtual machine boundary, the method comprising:

at the first virtual machine:
based on an event signaling request by a first process running at the first virtual machine, updating a shared register that is accessible by the second virtual machine, updating the shared register including updating a signal and a first wake cookie stored in the shared register; and sending an event signal message through the virtualization fabric to the second virtual machine, the event signal message including a register identifier of the shared register; and at the second virtual machine:
receiving the event signal message sent by the first virtual machine and identifying the register identifier from the event signal message;

based on the register identifier, reading the shared register, including identifying a value of the signal stored in the shared register and identifying a first value of the first wake cookie stored in the shared register;

comparing the first value of the first wake cookie with a second value of a second wake cookie stored at the second virtual machine; and based at least on the value of the signal, and only when the first value of the first wake cookie is different from the second value of the second wake cookie, signaling a second process running at the second virtual machine.

2. The method of claim 1, the method further comprising:
the first virtual machine synchronizing a first event signaling object at the first virtual machine with the shared register; and
the second virtual machine synchronizing a second event signaling object at the second virtual machine with the shared register.

3. The method of claim 1, further comprising:
the first process running at the first virtual machine synchronizing with shared memory prior to sending the event signal message; and
the second process running at the second virtual machine synchronizing with the shared memory based on the second process having been signaled.

4. The method of claim 1, the method further comprising:
at the first virtual machine:
communicating an event identifier to the second virtual machine over a first communications channel;
creating a first event signaling object corresponding to the event identifier;
associating the shared register with the first event signaling object;
receiving the event identifier from the second virtual machine over a second communications channel;
authenticating the event identifier; and
after authenticating the event identifier, sending the register identifier to the second virtual machine over the second communications channel; and
at the second virtual machine:
receiving the event identifier from the first virtual machine over the first communications channel;
creating a second event signaling object corresponding the event identifier;
sending the event identifier to the first virtual machine over the second communications channel; and receiving the register identifier from the first virtual machine over the second communications channel.

5. The method of claim 4, wherein the first communications channel is an operating system-level communications channel, and wherein the second communications channel is a hypervisor-level communications channel.

6. The method of claim 4, wherein the first and second processes comprise user mode processes, and wherein the first and second event signaling objects comprise kernel mode data structures.

7. A computer system, comprising:
one or more processors; and
one or more computer-readable media having stored thereon computer-executable instructions that are executable by the one or more processors to cause the computer system to provide a virtualization fabric hosting a plurality of virtual machines including a first virtual machine and a second virtual machine, and to facilitate communication of a low-latency event across a virtual machine boundary, the computer-executable instructions including instructions that are executable to cause the computer system to perform at least:
at the first virtual machine:
based on an event signaling request by a first process running at the first virtual machine, update a shared register that is accessible by the second virtual machine, updating the shared register including updating a signal and a first wake cookie stored in the shared register; and
send an event signal message through the virtualization fabric to the second virtual machine, the event signal message including a register identifier of the shared register; and
at the second virtual machine:
receive the event signal message sent by the first virtual machine and identifying the register identifier from the event signal message;
based on the register identifier, read the shared register, including identifying a value of the signal stored in the shared register and identifying a first value of the first wake cookie stored in the shared register;
compare the first value of the first wake cookie with a second value of a second wake cookie stored at the second virtual machine; and
based at least on the value of the signal, and only when the first value of the first wake cookie is different from the second value of the second wake cookie, signal a second process running at the second virtual machine.

8. The computer system of claim 7, wherein the first virtual machine synchronizes a first event signaling object at the first virtual machine with the shared register, and the second virtual machine synchronizes a second event signaling object at the second virtual machine with the shared register.

9. The computer system of claim 7, wherein the first process running at the first virtual machine synchronizes with shared memory prior to sending the event signal message, and the second process running at the second virtual machine synchronizes with the shared memory based on the second process having been signaled.

10. The computer system of claim 7, the computer-executable instructions also including instructions that are executable to cause the computer system to:
at the first virtual machine:
communicate an event identifier to the second virtual machine over a first communications channel;

create a first event signaling object corresponding to the event identifier;

associate the shared register with the first event signaling object;

receive the event identifier from the second virtual machine over a second communications channel;

authenticate the event identifier; and after authenticating the event identifier, send the register identifier to the second virtual machine over the second communications channel; and at the second virtual machine:

receive the event identifier from the first virtual machine over the first communications channel;

create a second event signaling object corresponding the event identifier;

send the event identifier to the first virtual machine over the second communications channel; and receive the register identifier from the first virtual machine over the second communications channel.

11. The computer system of claim 10, wherein the first communications channel is an operating system-level communications channel, and wherein the second communications channel is a hypervisor-level communications channel.

12. The computer system of claim 10, wherein the first and second processes comprise user mode processes, and wherein the first and second event signaling objects comprise kernel mode data structures.

13. A computer program product comprising one or more hardware storage devices having stored thereon computer-executable instructions that are executable by one or more processors to cause a computer system to provide a virtualization fabric hosting a plurality of virtual machines including a first virtual machine and a second virtual machine, and to facilitate communication of a low-latency event across a virtual machine boundary, the computer-executable instructions including instructions that are executable to cause the computer system to perform at least:

at the first virtual machine:

based on an event signaling request by a first process running at the first virtual machine, update a shared register that is accessible by the second virtual machine, updating the shared register including updating a signal and a first wake cookie stored in the shared register; and send an event signal message through the virtualization fabric to the second virtual machine, the event signal message including a register identifier of the shared register; and at the second virtual machine:

receive the event signal message sent by the first virtual machine and identifying the register identifier from the event signal message;

based on the register identifier, read the shared register, including identifying a value of the signal stored in the shared register and identifying a first value of the first wake cookie stored in the shared register;

compare the first value of the first wake cookie with a second value of a second wake cookie stored at the second virtual machine; and based at least on the value of the signal, and only when the first value of the first wake cookie is different from the second value of the second wake cookie, signal a second process running at the second virtual machine.

14. The computer program product of claim 13, the computer-executable instructions also including instructions that are executable to cause the computer system to:

at the first virtual machine:

communicate an event identifier to the second virtual machine over a first communications channel;

create a first event signaling object corresponding to the event identifier;

associate the shared register with the first event signaling object;

receive the event identifier from the second virtual machine over a second communications channel;

authenticate the event identifier; and after authenticating the event identifier, send the register identifier to the second virtual machine over the second communications channel; and at the second virtual machine:

receive the event identifier from the first virtual machine over the first communications channel;

create a second event signaling object corresponding the event identifier;

send the event identifier to the first virtual machine over the second communications channel; and receive the register identifier from the first virtual machine over the second communications channel.

15. The computer program product of claim 14, wherein the first communications channel is an operating system-level communications channel, and wherein the second communications channel is a hypervisor-level communications channel.

16. The computer program product of claim 14, wherein the first and second processes comprise user mode processes, and wherein the first and second event signaling objects comprise kernel mode data structures.

17. The computer program product of claim 13, wherein the first virtual machine synchronizes a first event signaling object at the first virtual machine with the shared register, and the second virtual machine synchronizes a second event signaling object at the second virtual machine with the shared register.

18. The computer program product of claim 13, wherein the first process running at the first virtual machine synchronizes with shared memory prior to sending the event signal message, and the second process running at the second virtual machine synchronizes with the shared memory based on the second process having been signaled.

* * * * *